(12) United States Patent
Reed et al.

(10) Patent No.: US 7,810,168 B2
(45) Date of Patent: Oct. 12, 2010

(54) METHOD AND APPARATUS FOR MOUNTING A VISION SYSTEM

(75) Inventors: Matthew Reed, New Boston, NH (US); Tim Loring, Bedford, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 1498 days.

(21) Appl. No.: 11/175,005

(22) Filed: Jul. 5, 2005

(65) Prior Publication Data

US 2006/0143764 A1 Jul. 6, 2006

Related U.S. Application Data

(60) Provisional application No. 60/634,930, filed on Dec. 10, 2004.

(51) Int. Cl.
*A42B 3/00* (2006.01)
(52) U.S. Cl. ............................... 2/6.2; 2/422
(58) Field of Classification Search ............... 2/422, 2/6.6, 6.2, 6.3, 6.7; 359/409, 815, 632; 224/181
See application file for complete search history.

(56) References Cited

U.S. PATENT DOCUMENTS

| | | | |
|---|---|---|---|
| 4,449,787 A | 5/1984 | Burbo et al. ............... 350/538 |
| 4,689,834 A | 9/1987 | McCarthy et al. | |
| 5,176,342 A | 1/1993 | Schmidt et al. | |
| 5,179,735 A | 1/1993 | Thomanek | |
| 5,226,181 A | 7/1993 | Polednak et al. | |
| 5,331,684 A | 7/1994 | Baril et al. | |
| 5,347,119 A | 9/1994 | Connors | |
| 5,408,086 A | 4/1995 | Morris et al. | |
| 5,446,585 A | 8/1995 | Morley et al. ............ 359/411 |
| 5,467,479 A | 11/1995 | Mattes | |
| 5,469,578 A * | 11/1995 | Mattes ......................... 2/6.7 |
| 5,471,678 A | 12/1995 | Dor ............................. 2/6.7 |
| 5,506,730 A | 4/1996 | Morley et al. ............ 359/815 |
| 5,542,627 A | 8/1996 | Crenshaw et al. ........ 244/121 |
| 5,648,862 A | 7/1997 | Owen | |
| 5,703,354 A | 12/1997 | Wannagot et al. | |
| 5,914,816 A | 6/1999 | Soto et al. ................ 359/630 |
| 6,081,094 A | 6/2000 | Crenshaw et al. ........ 320/114 |
| 6,457,179 B1 | 10/2002 | Prendergast | |
| 6,472,776 B1 | 10/2002 | Soto et al. | |
| 6,662,370 B1 | 12/2003 | Buchanan, Jr. ............. 2/6.2 |

(Continued)

FOREIGN PATENT DOCUMENTS

WO 9965049 12/1999

OTHER PUBLICATIONS

International Search Report with Written Opinion, dated May 3, 2006, received in corresponding PCT Application (11 pages).

*Primary Examiner*—Shaun R Hurley
*Assistant Examiner*—Andrew W Sutton

(57) ABSTRACT

An adjustable mounting arrangement is provided for mounting a vision system to a helmet. The mounting system includes a mount assembly having a latch pivot that can be removably affixed to a helmet mount. The mounting assembly further includes a base that is rotatable about the latch pivot. The base includes a tilt adjustment mechanism positioned to bear against a paddle portion extending from the latch pivot for adjusting the tilt angle of the base relative to the helmet mount.

27 Claims, 9 Drawing Sheets

U.S. PATENT DOCUMENTS

| | | |
|---|---|---|
| 6,751,810 B1 | 6/2004 | Prendergast |
| 6,862,748 B2 | 3/2005 | Prendergast |
| 6,938,276 B1 | 9/2005 | Prendergast |
| 6,957,449 B2 | 10/2005 | Prendergast |
| 6,986,162 B2 | 1/2006 | Soto et al. |
| 7,418,738 B2 | 9/2008 | Prendergast |
| 7,444,683 B2 | 11/2008 | Prendergast et al. |
| 7,504,918 B2 | 3/2009 | Prendergast et al. |
| 2002/0120979 A1 | 9/2002 | Prendergast |
| 2007/0012830 A1 | 1/2007 | Prendergast |
| 2007/0152406 A1 | 7/2007 | Prendergast et al. |
| 2008/0184462 A1 | 8/2008 | Prendergast |
| 2008/0272868 A1 | 11/2008 | Prendergast et al. |
| 2009/0077721 A1 | 3/2009 | Prendergast |
| 2009/0135479 A1 | 5/2009 | Soto et al. |
| 2009/0268288 A1 | 10/2009 | Prendergast |
| 2010/0067126 A1 | 3/2010 | Prendergast |

\* cited by examiner

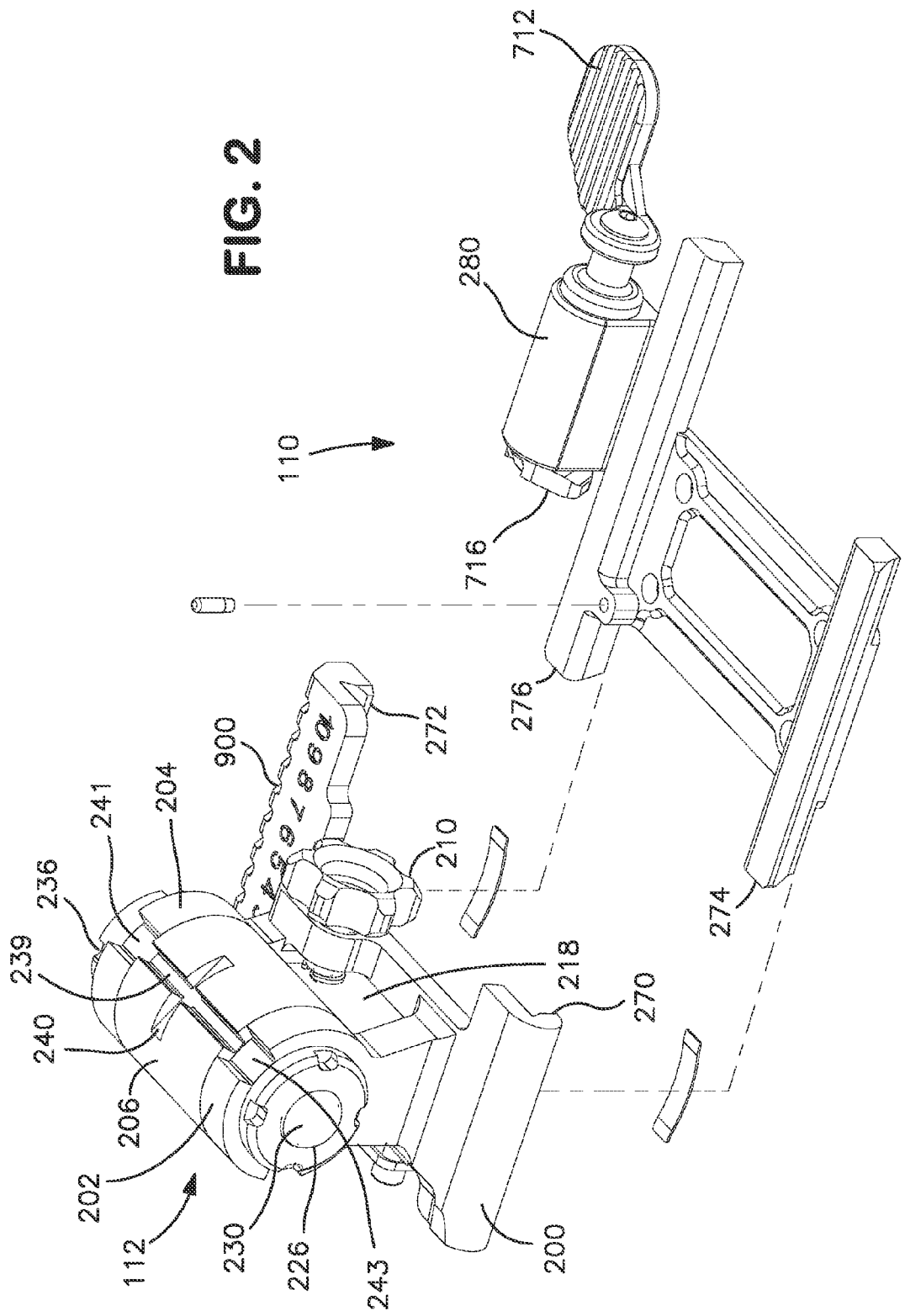

METHOD AND APPARATUS FOR MOUNTING A VISION SYSTEM

CROSS-REFERENCE TO RELATED APPLICATIONS

The present application claims the benefit of U.S. provisional patent application Ser. No. 60/634,930, filed Dec. 10, 2004, the entire disclosure of which is incorporated herein by reference.

TECHNICAL FIELD

The present invention is generally related to vision systems and, more particularly, to a method and apparatus for mounting a vision system to, for example a helmet.

BACKGROUND

Night vision systems include image intensification, thermal imaging, and fusion monoculars, binoculars, bioculars, and goggles, whether hand-held, weapon mounted, or helmet mounted. A common helmet mount is the ANVIS (Aviator's Night-Vision Imaging System) mount. In a helmet mounted configuration, the helmet may include a helmet mount, e.g. an ANVIS mount, fixed thereto for removably receiving an associated mount affixed to the night vision system.

Both the helmet mount and the night vision system mount may be configured to allow for fit and location adjustment of the night vision system. For example, the helmet mount may allow vertical adjustment of the night vision system, and the night vision system mount may allow for fore and aft adjustment, interpupilary distance adjustment, and may allow rotation of the vision system to a stored area adjacent a top surface of the helmet.

The night vision system mount may also be configured for allowing tilt adjustments, i.e. adjustments of the angle of the night vision system relative to the helmet mount. One difficulty associated with providing facile tilt adjustment in a night vision system mount has been the limited physical space allowed for rotation of the system relative to the helmet mount, especially in the case of ANVIS mount configurations. This difficulty has been exacerbated by the advance of fusion systems. Fusion night vision systems are typically used by the military and law enforcement personnel and include image intensification tubes, focal plane arrays, and displays that take up space.

In one configuration, the night vision system mount may include an eccentric shaft extending through the mount. The system may be rotated about the eccentric shaft to achieve a desired tilt angle, and may be locked at the tilt angle by rotation of the shaft against an associated bore. The eccentric shaft, however, creates difficulties when a sealed/waterproof system is desired.

BRIEF DESCRIPTION OF THE DRAWINGS

For a better understanding of the present invention, together with other objects, features and advantages, reference should be made to the following detailed description, which should be read in conjunction with the following figures wherein:

FIG. 2 is an exploded view of the mount and rail assembly of FIG. 1A;

DETAILED DESCRIPTION

Figure 1A:
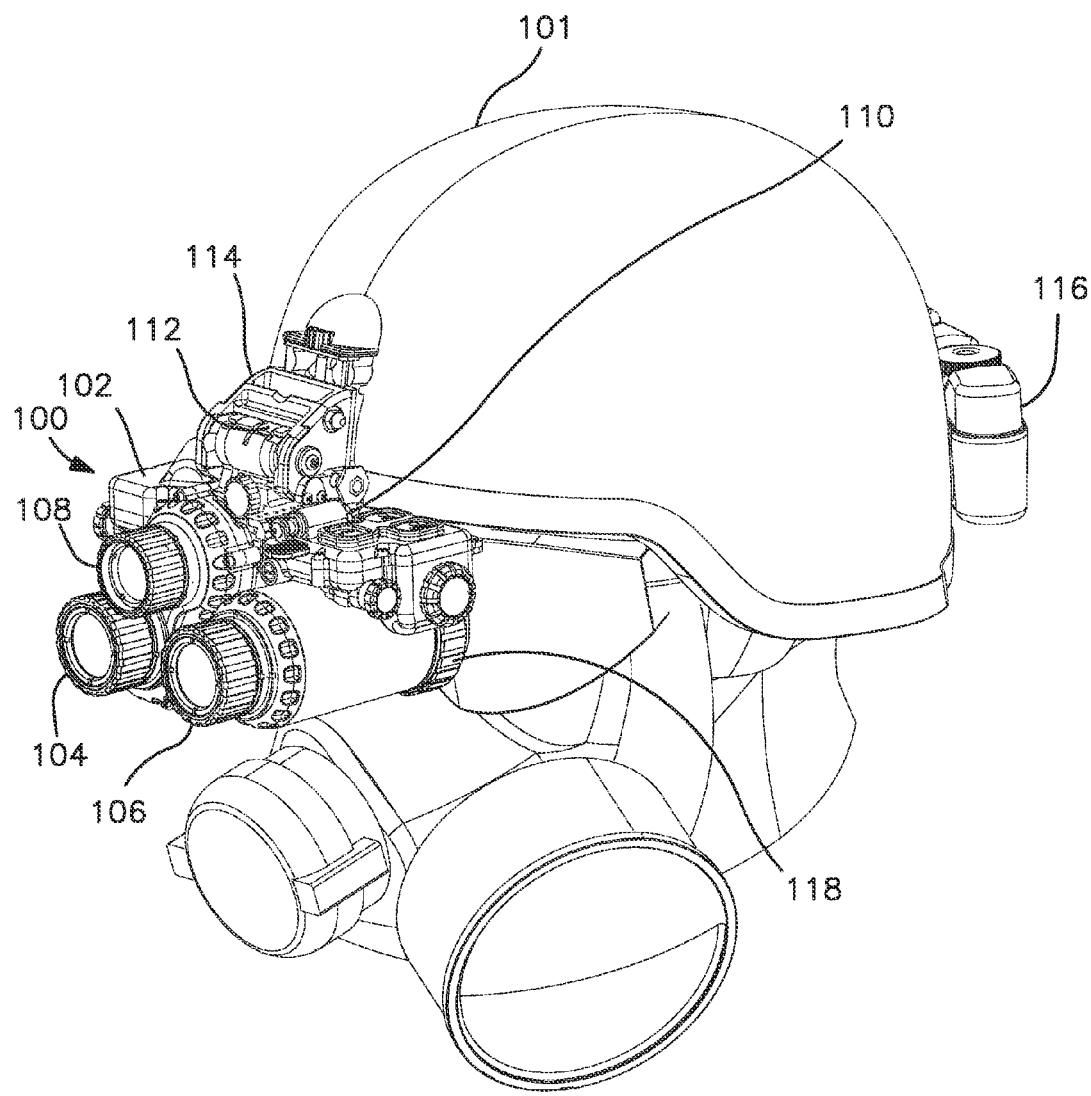
FIG. 1A is an isometric view of a vision system consistent with one embodiment of the present invention and mounted to a helmet.
Figure 1B:
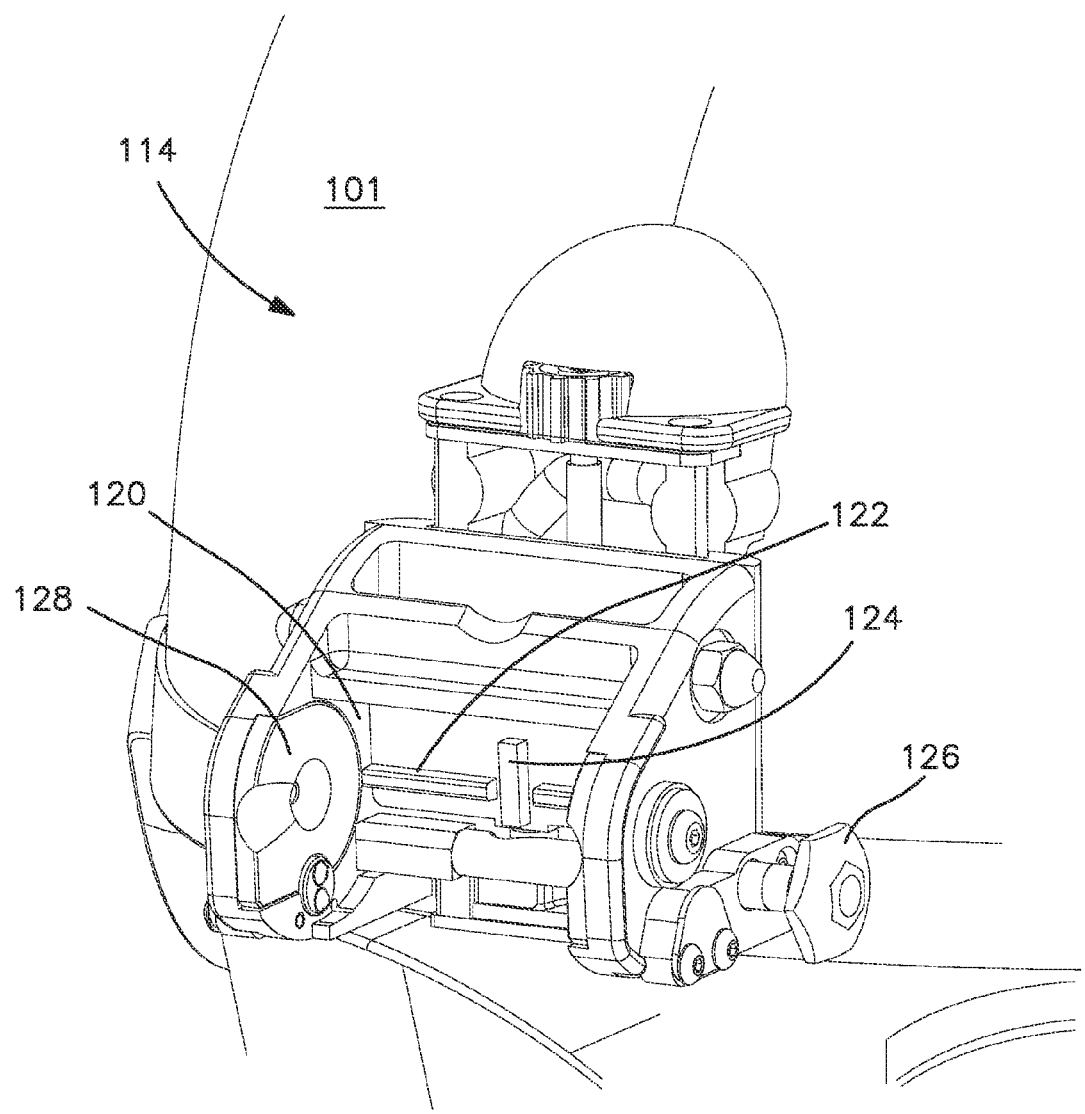
FIG. 1B is an isometric view of an ANVIS mount mounted to a helmet.

FIG. 1A is an isometric view of an embodiment of a vision system 100 mounted to a helmet 101 in a manner consistent with one embodiment of the present invention and FIG. 1B is an isometric view of an ANVIS mount 114 mounted to a helmet 101. The vision system 100 may have a housing 102 and imaging elements, such as a first image intensification channel 104, a second image intensification channel 106, and a thermal channel 108. Processing electronics associated with the image intensification channels 104, 106 and the thermal channel 108 may be disposed at least partially within the housing 102. The housing 102 may be sealed/waterproof to protect the electronics from contaminants and water, and may be affixed to a rail 110 that may be slidably affixed to a mount 112, thereby coupling the housing and imaging elements to the mount 112. The mount 112 may be configured for removably engaging the ANVIS mount 114 on the helmet 101, and for providing tilt adjustment in a manner consistent with the present invention.

Referring to FIG. 1B, the ANVIS mount 114 may include a moveable plate 120 having a horizontal cross member 122 and a vertical cross member 124. The plate 120 may be secured in a position to prevent rotation of the mount 112. A mount release 126 may be actuated by a user to disengage the horizontal cross member 122 from a cooperating cross slot 239, 282 in the mount 112, depicted in FIGS. 2-5. The vertical cross member 124 may cooperate with a detent recess 240 in the mount 112 and may align the ANVIS mount 114 left-to-right with the mount 112. The ANVIS mount 114 may additionally include opposing depressions 128 configured to accept cooperating ball plungers 230, 232 associated with the mount 112, such as shown in FIG. 3, or similar mounting features.

Figure 6A:
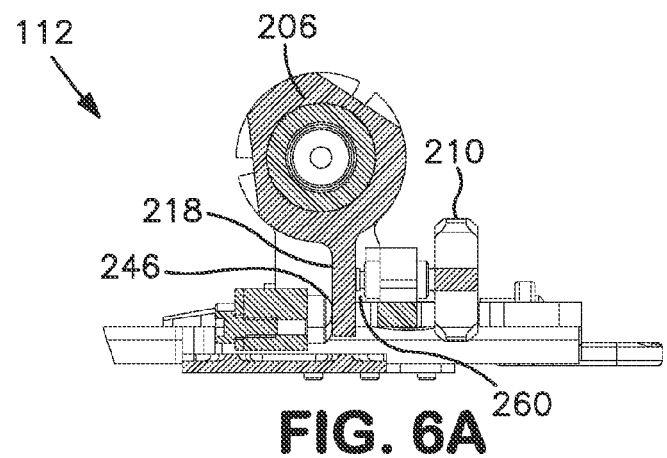
FIGS. 6A-6C are sectional views of a mount as shown in FIG. 1A showing the mount positioned at 0°, +7° and −7° tilt angles, respectively.
Figure 6B:
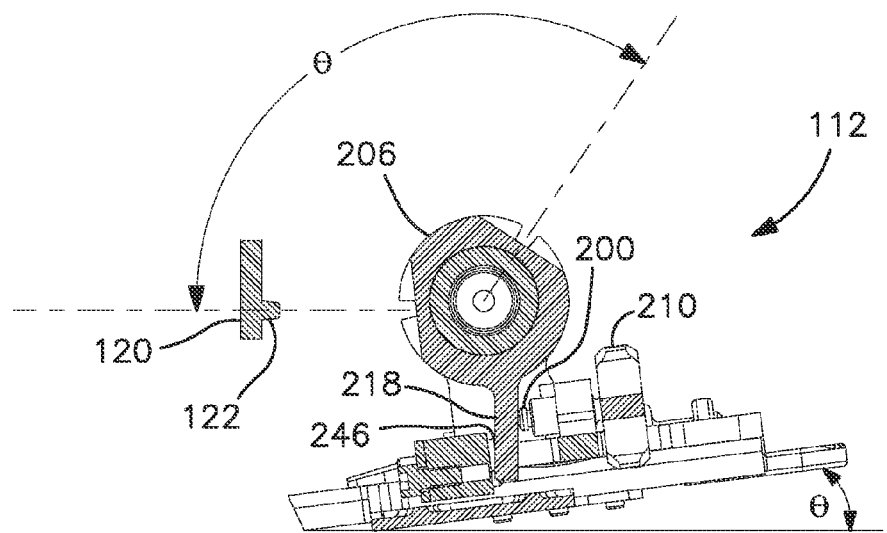

The mount 112, and the vision system 100 coupled thereto, may be positioned in a stowed position in which the vision system 100 is disposed adjacent a top surface of the helmet 101. The mount 112 and vision system 100 may also be placed in an operable position in which the vision system 100 is disposed in the user's field of view. When the mount 112 and vision system 100 are in the stowed position, the horizontal cross member 122 of the ANVIS mount 114 may engage the cooperating cross slot 239 in the mount 212, thereby retaining the mount 112 and vision system 100 in the stowed position. In the operable position the horizontal cross member 122 may engage a second cooperating cross slot 282 in the mount 212, thereby maintaining the mount 112 and vision system 100 in the operable position. According to one embodiment, the cross slots 239 and 282 may have an angular offset φ in the range of between about 100-130 degrees, as shown in FIG. 6B. Various other angular offsets φ may also be employed, permitting various relative stowed and operable positions of the mount 112 and vision system 100.

The system 100 may be powered by batteries disposed in a removable battery pack 116 affixed to the helmet 101. An operator may view a scene through a left eyepiece 118 and an associated right eyepiece (not shown in the FIG. 1). Information from the first image intensification ($I^2$) channel 104 may be fused with the information from the thermal channel 108 and presented for viewing through the right eyepiece and information from the second ($I^2$) channel 106 may be presented for viewing through the left eyepiece 118. The eyepieces may have one or more ocular lenses.

Figure 3:
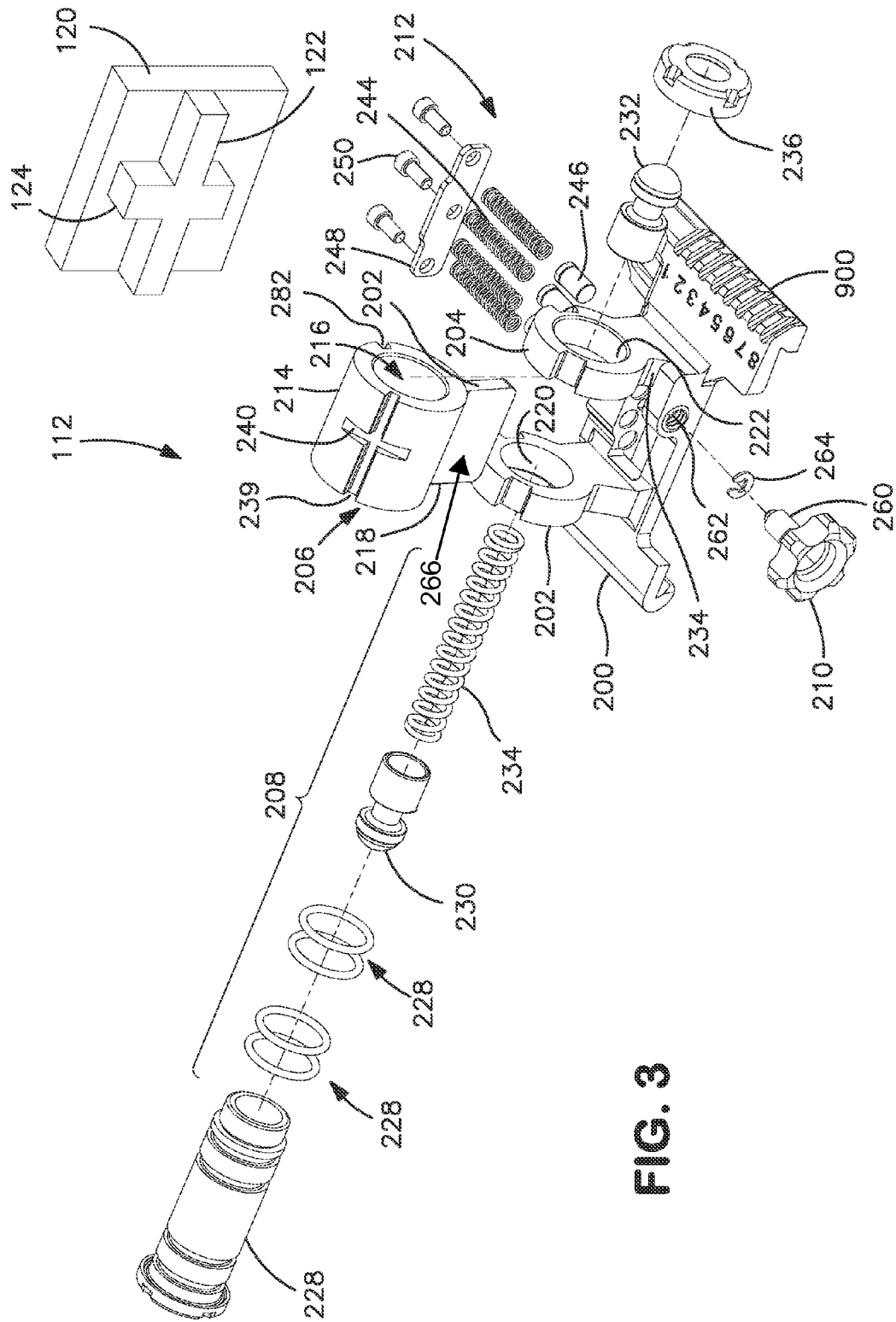
FIG. 3 is an exploded view of the mount of FIG. 1A.
Figure 5:
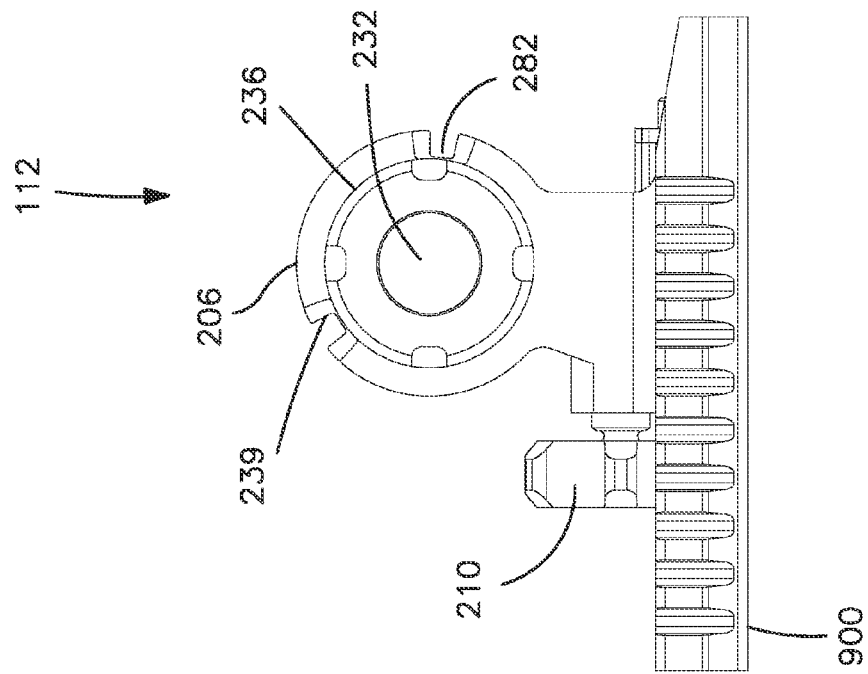
FIG. 5 is a side view of the mount of FIG. 1A.
Figure 4:
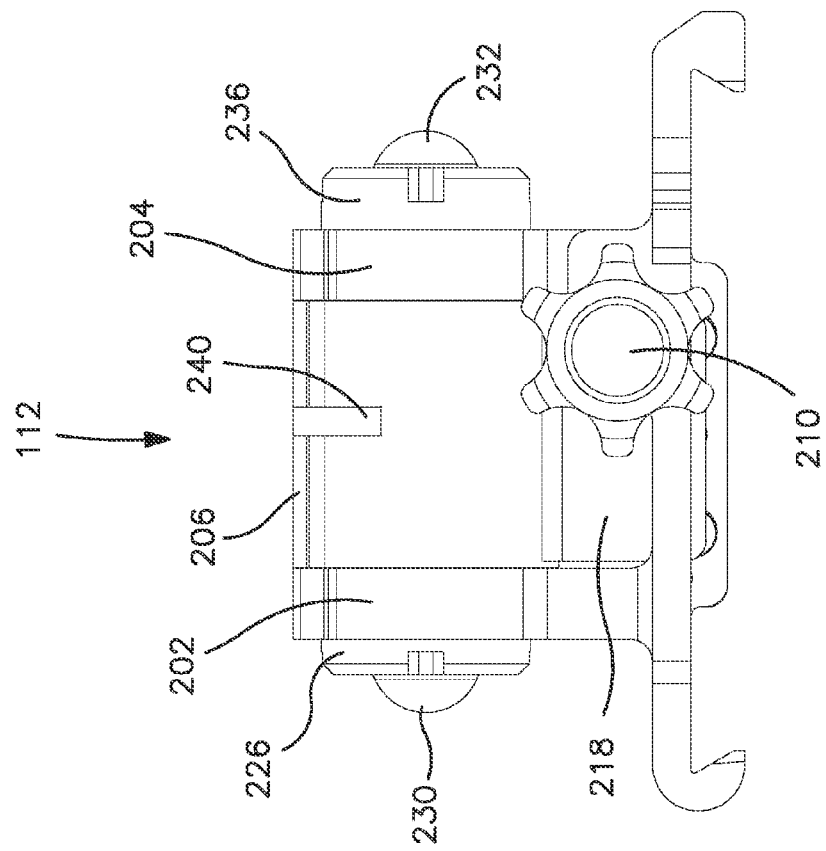
FIG. 4 is a front view of the mount of FIG. 1A.

Referring to FIGS. 2 through 5, various aspects of the mount 112 consistent with the present invention are shown. FIG. 2 is an exploded view of the mount 112 and the rail 110 assembly, and FIG. 3 is an exploded view of the mount 112 and the moveable plate 120 of the ANVIS mount 114. FIG. 4 is a front view of the mount 112, and FIG. 5 is a side view of the mount 112. In an embodiment consistent with the present invention, a mount may include a base rotatable about, and/or relative to, a pivot assembly. As shown in the illustrated embodiment of FIGS. 2 through 5, the mount 112 may include a base 200 having first 202 and second 204 posts extending therefrom. A latch assembly, including a latch pivot 206 and a latch assembly 208, may be rotatably coupled to the base 200 by the first 202 and second 204 posts. The mount 112 may further include a tilt knob 210, and a counterforce assembly 212, which may be associated with the base 200. The latch pivot 206 may include a body portion 214 having an opening 216 therethrough and a paddle portion 218 extending outwardly from the body portion 214. The body portion 214 may be positioned between the posts 202, 204 with the opening 216 in alignment with openings 220, 222 through the posts and the paddle portion 218 extending into a slot 224 in the base 200.

The latch assembly 208 may include at latch core 226, o-rings 228, first 230 and second 232 ball plungers, a compression spring 234 and a nut 236. The latch assembly 208 may extend through the openings in the latch pivot 206 and the posts 202, 204 with the ends of the ball plungers 230, 232 biased outward from the ends of the latch assembly 208 by the compression spring 234. Upon attachment of the mount 112 to a helmet including an ANVIS helmet mount 114, the ball plungers 230, 232 may be depressed against the force of the compression spring 234 until they align with associated depressions 128 in the ANVIS mount 114. Once aligned with the depressions 128, the ball plungers 230, 232 may snap into the depressions under the force of the compression spring 234 to removably affix the mount 112 to the ANVIS mount 114. The latch pivot 206 may include a first detent recesses 240 that may mate with a corresponding vertical cross member 124 on the ANVIS mount 114 and a first cross slot 239 that may mate with the horizontal cross member 122 to fix the latch pivot 206 to the helmet mount 114 so that it is not freely movable relative to the helmet 101. The pivot latch 206 may include a second cross slot 282, e.g. as shown in FIG. 5, which may be angularly spaced from the first cross slot 239 around the pivot latch 206. The pivot latch may also include a second detent recess (not shown) which may intersect and/or be associated with the second cross slot 282.

The base 200 may be freely pivotable about the latch core 226, and therein may be freely pivotable relative to the latch pivot 206. The counterforce assembly 212 may be affixed to the base 200 to impart a spring force on rear surface 242 of the paddle portion 218. In the illustrated exemplary embodiment, the counterforce assembly 212 includes four compression springs 244 disposed in associated bores in the base 200. A spring tip 246 is associated with each of the compression springs, and a cover 248 is secured to the base by fasteners 250 to capture the springs within the base 200. When assembled, the tips 246 engage the rear surface 242 of the paddle portion 218 under the bias of the compression springs 244. The spring force imparted on the rear surface 242 of the paddle portion 218 may pivotally bias the base 200 about the latch pivot 206 in a first direction relative to the paddle portion 218.

In the illustrated embodiment, the tilt knob 210 includes a threaded shaft 260 that extends through a threaded opening 262 in the base 200. The tilt knob 210 may be secured to the base by an e-clip 264. The end of the shaft 260 may be positioned to engage the front surface 266 of the paddle portion 218 to provide a tilt adjustment mechanism. Since the latch pivot 206 is fixed to the helmet mount 114, rotation of the knob 210 in one direction, e.g. clockwise, forces the shaft 260 of the knob against the paddle portion 218 and causes rotation of the base 200 about the latch core 226 in a first direction against the pivotal bias of counterforce assembly 212. Rotation of the knob 210 in an opposite direction, e.g. counterclockwise, allows rotation of the base 200 about the latch core 226 in an opposite direction under the pivotal bias of the counterforce assembly 212.

Figure 6C:
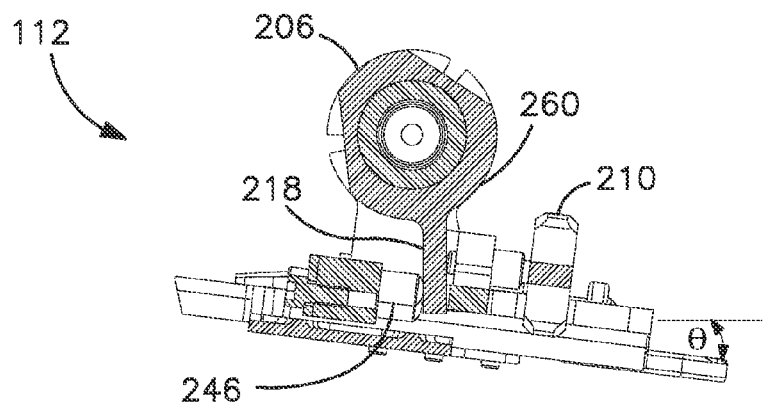

Thus, a selectable tilt angle may be achieved through rotation of the knob 210 to cause the base 200 to pivot relative to the latch pivot 206, and/or the helmet mount 114, about the latch core 226. In one embodiment, the mount 112 may allow a tilt angle of the vision system 100 relative to the helmet mount 114 of about +/−10°. FIGS. 6A to 6C are sectional views of a mount 112 as shown in FIGS. 2-5 showing the mount 112 positioned at 0°, +7° and −7° tilt angles θ, respectively. The angular range of tilt of the mount 112 relative to the helmet mount 114 may, at least in part, be a function of the width of the slot 224 in the base 200, the travel of the threaded shaft 260 of the knob 210 and of the counterforce assembly 212, as well as the angular clearance of the slots 241, 243 in the posts 202, 204 relative to the width of the horizontal cross member 122 of the ANVIS mount 114. Various other factors may also and/or alternatively influence and/or control the tilt angle. Accordingly, a mount 112 consistent with the present disclosure may provide a wide range of tilt angles.

Figure 7:
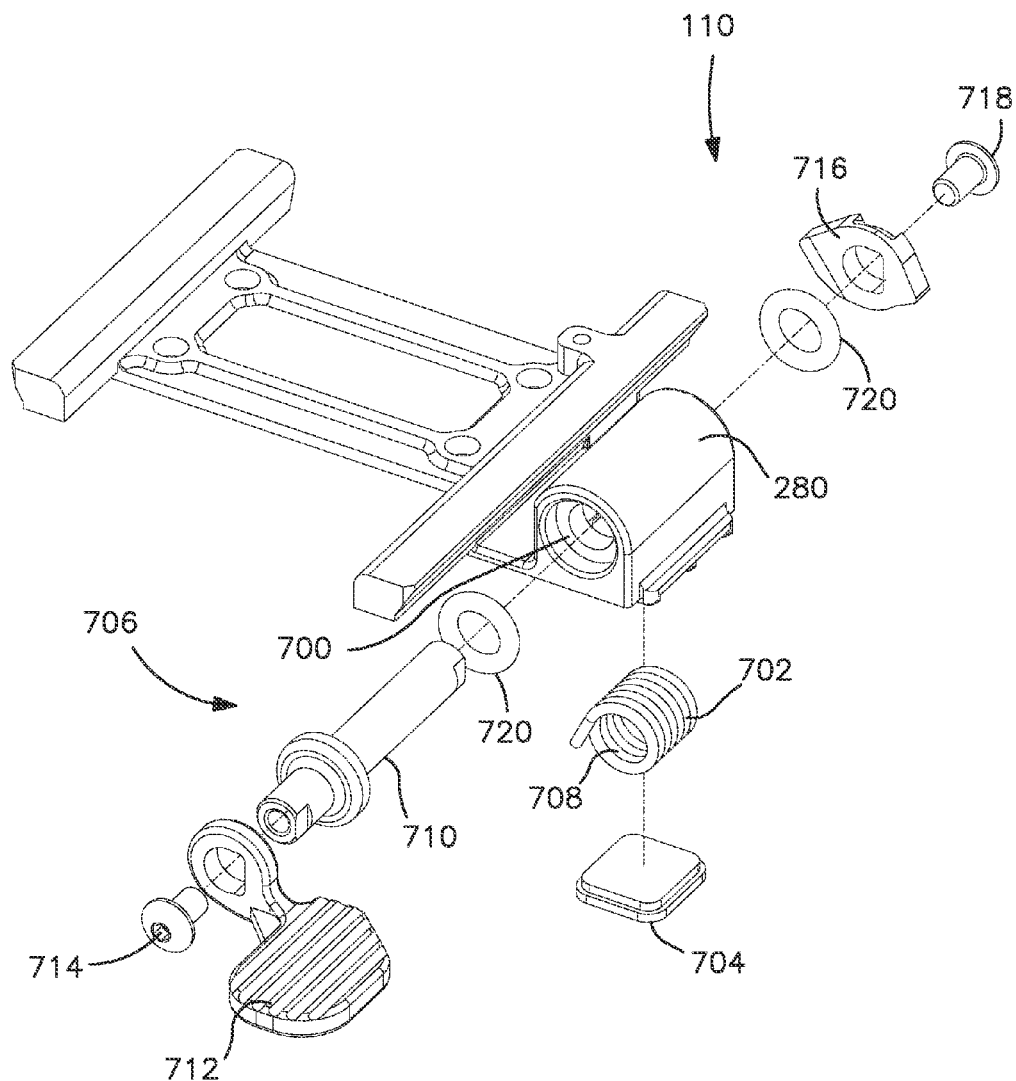
FIG. 7 is an exploded view of the rail assembly of FIG. 1A.
Figure 8:
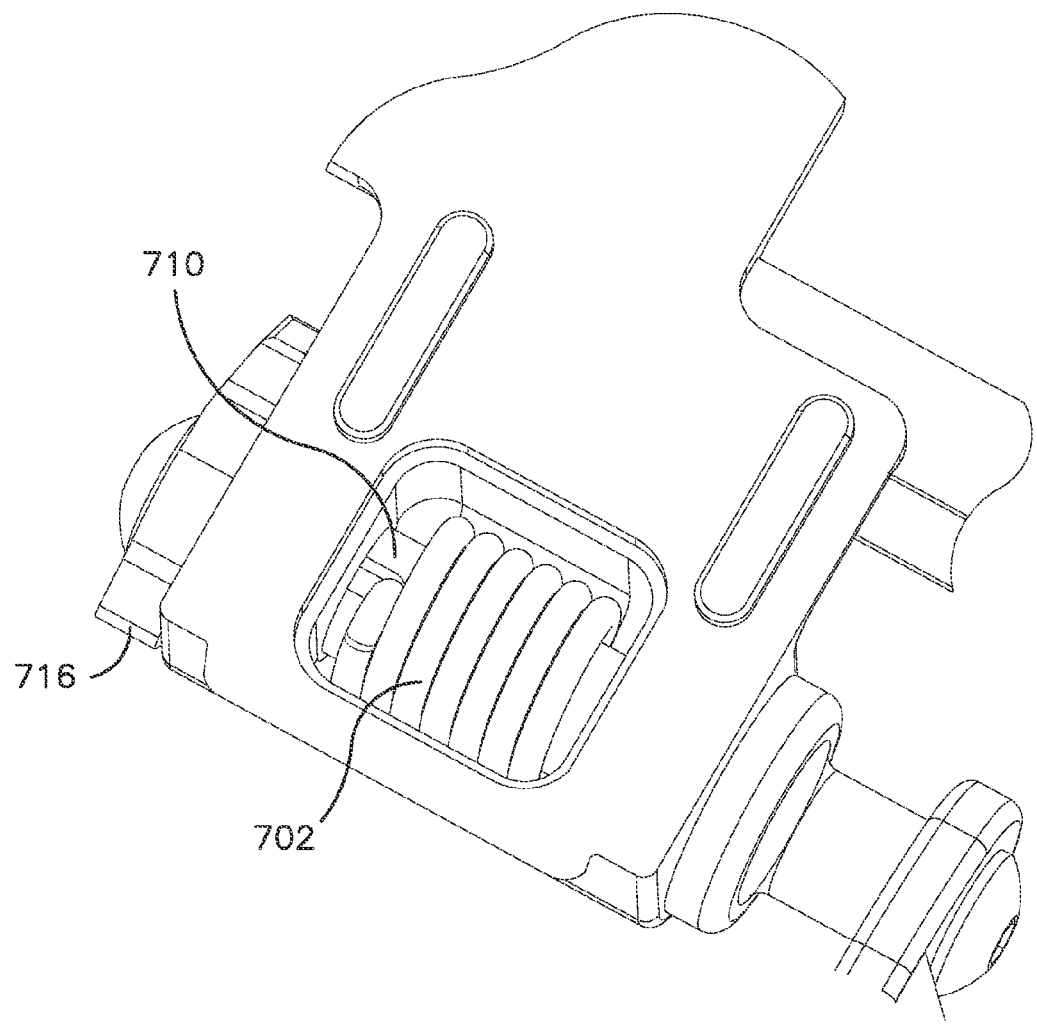
FIG. 8 is a bottom perspective view of a portion of the rail assembly of FIG. 1A.

Consistent with an embodiment of the present invention, the mount 112 may be affixed to the rail assembly 110. In the particular embodiment of FIG. 2, and FIGS. 7 and 9, the mount 112 may be slidably affixed to the rail assembly 110 through cooperating rails 270, 272 and 274, 276 on the mount 112 and the rail assembly 110, respectively. The rail assembly 110 may include an extension 280 at a side thereof. As shown in FIG. 7, the extension 280 may include an opening 700 therethrough for receiving a spring 702. A cover 704 may close the spring 702 within the opening 700. A catch assembly 706 may extend through the opening 700 in the extension and a central opening 708 of the spring. The catch assembly may include a shaft 710 and a lever 712 secured to the shaft by a fastener 714. A catch 716 may be secured to an end of the shaft 710 by a fastener 718. O-rings 720 on either side of the extension 280 may seal the opening. When assembled, the shaft 710 may be rotated within the opening 700 in the extension against a bias of the spring 702.

Figure 9:
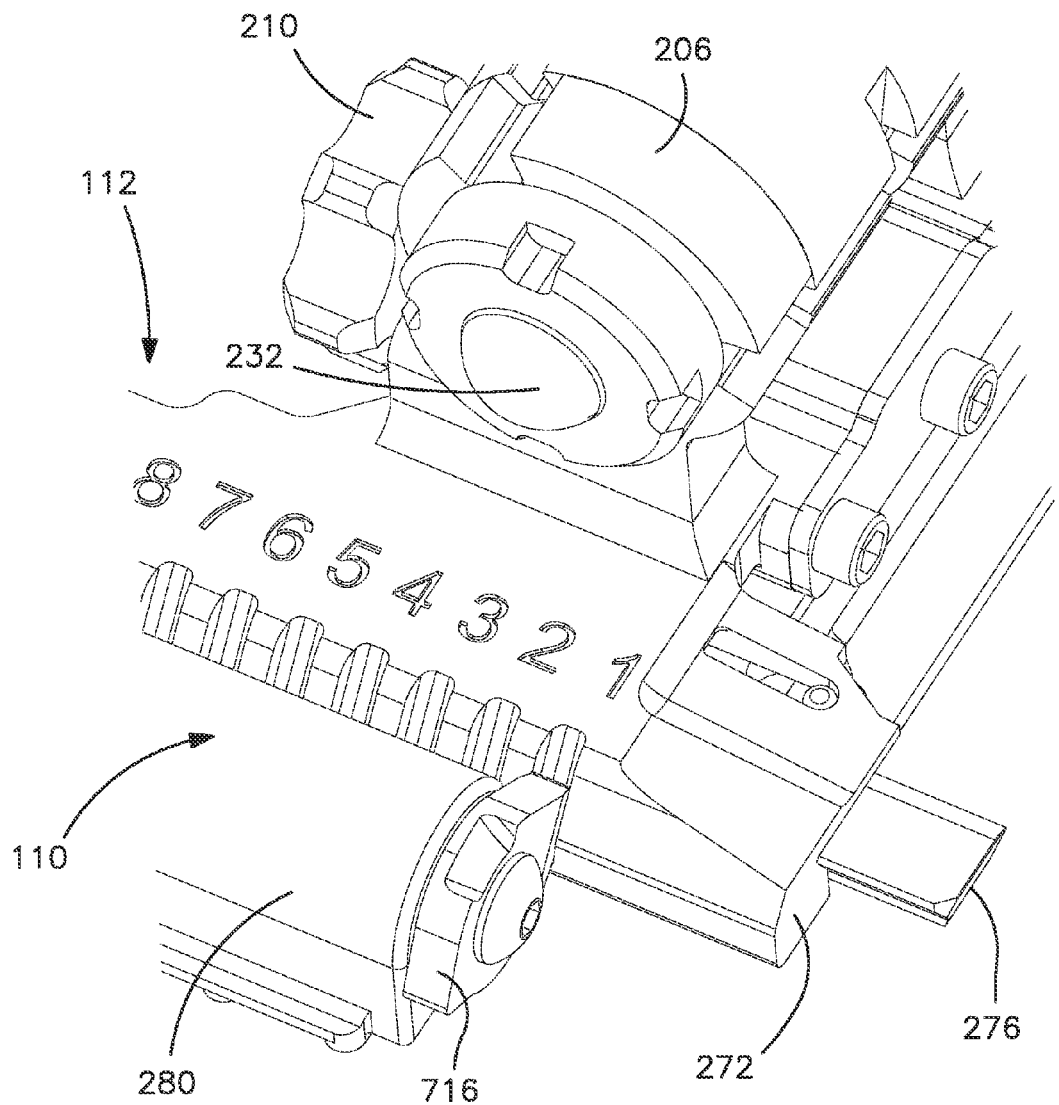
FIG. 9 is a top perspective view of a portion of the mount and rail assembly of FIG. 1A.

As shown in FIG. 9, the mount 112 may be assembled to the rail assembly 110 by cooperating and slidable engagement of the rails on the mount 112 and the rail assembly 110. Force may be applied to the lever 712 to rotate the catch assembly 706 against the bias of the spring 702 to release the catch assembly 706 to cause the catch 716 to disengage from a recess 900 formed in the base 200. The rail assembly 110, and/or the housing 102 of the vision system 100, may be slidably moved relative to the mount 112. When the rail assembly 110 is in a desired position relative to the mount 112, the force on the lever 712 of the catch assembly 706 may be released, allowing the catch assembly 706 to rotate under the bias of the spring 702 to cause the catch 716 to engage a recess 900 formed in the base 200 of the mount 112. Engagement of the catch 716 with an associated recess 900 in the base 200 may fix the fore/aft position of the rail assembly 110, and the vision system 100 affixed thereto, relative to the mount 112. As shown, the base 200 may include a plurality of spaced recesses 900 for receiving the catch 716 to allow a plurality of selectable fore/aft positions of the rail assembly 110 relative to the mount 112.

Accordingly, there is provided a system for mounting a vision system, for example, to a helmet. According to one aspect, a mounting system consistent with the present invention may allow a tilt angle of a vision system to be adjusted. According to this aspect, the mounting system may include a pivot and a base rotatable about the pivot. The pivot may include a paddle extending therefrom and the base may include a tilt adjustment mechanism which may bear against the paddle to pivot the base relative to pivot.

Although several embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A system comprising:
a helmet including a helmet mount,
a mount assembly removably affixed to said helmet mount, said mount assembly comprising a latch pivot having an outwardly extending paddle portion, and a base rotatable about said latch pivot relative to said helmet mount, said base including a tilt adjustment mechanism bearing against said paddle portion for pivotally adjusting an angle of said base relative to said helmet mount;
a rail assembly affixed to said mount assembly,
and a vision system coupled to said rail assembly.

2. A system according to claim 1, wherein said base further comprises a counterforce assembly bearing against said paddle portion and pivotally biasing said base toward a first direction.

3. A system according to claim 2, wherein said counterforce assembly comprises at least one spring engaged with said base and applying a spring force against said paddle portion.

4. A system according to claim 1, wherein said tilt adjustment mechanism comprises a threaded shaft positioned to engage said paddle portion, said threaded shaft threadably movable towards and away from said paddle portion.

5. A system according to claim 1, wherein said latch pivot comprises a cross slot positioned to engage a cross member on said helmet mount.

6. A system according to claim 1, wherein said rail assembly and said mount assembly comprise cooperating rails, and wherein said rail assembly is slidably affixed to said mount assembly through said cooperating rails.

7. A system according to claim 1, wherein said mount assembly comprises at least one detent and said rail assembly comprises a catch releasably engageable with said at least one detent for fixing a position of said rail assembly relative to said mount assembly.

8. A system according to claim 1, wherein the base comprises a first post and a second post, each post having an opening aligned with an axis of rotation of said latch pivot.

9. A system according to claim 8, wherein said first post and said second post each comprise a slot alignable with a cross slot in said latch pivot, said slots configured to limit angular rotation of said base relative to said latch pivot.

10. A system according to claim 9, wherein said latch pivot is disposed between said first and said second posts and rotatable about a latch assembly at least partially disposed in said openings in said first and second posts.

11. A system according to claim 10, wherein said latch assembly comprises a compression spring and at least one outwardly extending ball plungers.

12. A vision system mount comprising:
a pivot assembly comprising a latch pivot having a paddle portion extending therefrom; and
a base rotatable about said latch pivot, said base comprising a tilt adjustment mechanism positioned to bear against said paddle portion to pivot said base relative to said pivot assembly.

13. A vision system mount according to claim 12, wherein said base comprises a counterforce assembly bearing against said paddle portion and pivotally biasing said base about said latch pivot toward a first direction.

14. A vision system mount according to claim 13, wherein said counterforce assembly comprises at least one compression spring applying a spring force against said paddle portion.

15. A vision system mount according to claim 13, wherein said tilt adjustment mechanism comprises a threaded shaft threadably movable toward said paddle portion to pivot said base in a first direction against said pivotal bias of said counterforce assembly and threadably movable away from said paddle portion to pivot said base in a second direction under said pivotal bias of said counterforce assembly.

16. A vision system mount according to claim 12, wherein said pivot assembly further comprises a latch assembly, said latch assembly comprising a latch core and a first and second ball plunger, said first and second ball plunger being outwardly biased relative to said latch core and releasably engageable with a helmet mount.

17. A vision system mount according to claim 12, wherein said latch pivot comprises a cross slot for rotationally fixing said latch pivot relative to a helmet mount.

18. A vision system mount according to claim 12, wherein said base is slidably affixed to a rail assembly through cooperating rails disposed on said base and said rail assembly.

19. A vision system mount according to claim 18, wherein said base comprises at least one detent and said rail assembly comprises a catch releasably engageable with said detent for securing said base relative to said rail assembly.

20. A vision system mount according to claim 19, wherein said catch is biased toward an engaged position with said at least one detent.

21. A system according to claim 12, wherein the base comprises a first post and a second post, each post having an opening aligned with an axis of rotation of said latch pivot.

22. A system according to claim 21, wherein said first post and said second post each comprise a slot alignable with a cross slot in said latch pivot, said slots configured to limit angular rotation of said base relative to said latch pivot.

23. A method of adjustably mounting a vision system to a helmet comprising:
removably mounting a latch pivot comprising a paddle portion to a helmet mount;

pivotally coupling a base to said latch pivot, said base coupled to said vision system, and said base comprising a tilt adjustment mechanism positioned to bear against said paddle portion;

pivotally biasing said base about said latch pivot in a first direction; and moving said tilt adjustment mechanism relative to said paddle portion to adjust a tilt angle of said base relative to said helmet mount.

24. A method according to claim 23, wherein said tilt adjustment mechanism comprises a threaded shaft, and wherein said moving said tilt adjustment comprises at least one of threadably advancing said tilt adjustment against said paddle portion or threadably withdrawing said tilt adjustment away from said paddle portion.

25. A method according to claim 23, wherein said base comprises a counterforce assembly for pivotally biasing said base about said latch pivot.

26. A method according to claim 25, wherein said counterforce assembly comprises at least one compression spring for applying a spring force against said paddle portion.

27. A method according to claim 23, further comprising slidably affixing a rail assembly to said base and slidably positioning said rail assembly relative to said base.

* * * * *